(12) United States Patent  
Dahlem

(10) Patent No.: US 6,363,957 B1
(45) Date of Patent: Apr. 2, 2002

(54) END USER REQUIREMENT SUPPLY USING SEGMENTATION

(75) Inventor: David F. Dahlem, Somers, CT (US)

(73) Assignee: PG&E National Energy Group, Inc., Bethesda, MD (US)

( * ) Notice: Subject to any disclaimer, the term of this patent is extended or adjusted under 35 U.S.C. 154(b) by 0 days.

(21) Appl. No.: 09/714,977

(22) Filed: Nov. 20, 2000

(51) Int. Cl.[7] .................................................. G05D 7/06
(52) U.S. Cl. .................... 137/1; 137/236.1; 137/599.03; 137/599.13; 73/195
(58) Field of Search ........................ 137/599.03, 599.13, 137/236.1, 1; 73/195

(56) References Cited

U.S. PATENT DOCUMENTS 1,308,569 A * 7/1919 Wylie
3,732,034 A * 5/1973 Reid et al.
5,661,232 A * 8/1997 Van Cleve et al. ........ 73/54.04

OTHER PUBLICATIONS

United States of America 92 FERC—61,062 Federal Energy Regulatory Commission; 18 CFR Parts 154, 161, 250, and 284, Order No. 637–B; pp. 1, 13–21; Issued Jul. 26, 2000.

* cited by examiner

Primary Examiner—Stephen M. Hepperle
(74) Attorney, Agent, or Firm—Nixon & Vanderhye PC

(57) ABSTRACT

A system and method are provided for supplying a predetermined amount of fluid, such as fuel and more specifically natural gas, to a target delivery site along at least two pipeline segments wherein a predetermined number of flow meter assemblies corresponding to a total of the at least two pipeline segments are provided to meter flow to the site. The flow meter assemblies are disposed in parallel for flowing a respective portion of the total flow to the target delivery site.

22 Claims, 3 Drawing Sheets

END USER REQUIREMENT SUPPLY USING SEGMENTATION

BACKGROUND AND SUMMARY OF THE INVENTION

The present invention relates to the transport of fluid, such as fuel, over a pipeline and more particularly, to a system and process for delivering contract capacity from two sources along a pipeline to a single end user or target delivery site without violation of prohibitions against forwardhaul-backhaul overlaps at a delivery point and without overlapping main line capacity. Thus, the present invention relates to a new and unique, multi-source, end-user specific, segmentation system and process.

According to current fuel supply protocols, for example for the supply of natural gas, a shipper will contract with a natural gas pipeline transmission company to ship a particular natural gas pipeline capacity on an intra or interstate natural gas pipeline transmission system. More specifically, the shipper/supply company will contract to supply a certain capacity over one or more zones of the pipeline system. That capacity can be segmented into non-overlapping segments along the system so that the contract capacity can be delivered to each of several discreet delivery points. It is generally considered to be outside the contract, however, to overlap delivery to an end user such that contract capacity is exceeded at any point along the pipeline. It is also in general considered outside the contract to deliver contract capacity from two sources, forwardhaul and backhaul, along a pipeline system to a single delivery point.

An exemplary gas pipeline system is illustrated in FIG. 1. As noted above, a shipper will buy a certain capacity from one or more designated zones of a gas pipeline system. The shipper can then deliver the contract capacity to customer(s) along the pipeline in and through those zones. With reference to the exemplary system illustrated in FIG. 1, assuming a customer is located at site X, assuming that the shipper has a source of fuel located at A and a second source of fuel located at B, and assuming that the shipper has bought a certain capacity along the pipeline from A to B, the shipper can transport the contract capacity along the pipeline from A to X or can transport the contract capacity along the pipeline from B to X. As a further alternative, the shipper can transport the contract capacity from source A to customer X and can also transport the contract capacity from source B to customer Y. As long as the shipper ships no more than the contract capacity along any segment of the pipeline system to a delivery point, the shipper will be considered by the pipeline transmission company to be operating consistent with the capacity contract. In this regard, a delivery point along an interstate or intrastate transmission system is a flow meter that is electronically monitored to determine flow at that point. In general a pipeline transmission company would consider it outside the contract, however, to deliver contract capacity from source A to customer X and from source A to customer Y concurrently because this would overlap mainline capacity. The pipeline transmission company would also consider it outside the capacity contract to deliver contract capacity from each of source A and source B to a delivery point at customer X.

It would be desirable to deliver contract capacity from two sources along a pipeline to a single end user or target delivery site. In such a case, the contract capacity with the transmission company could be one half the requirement of the customer.

The present invention provides a system and method for supplying a predetermined amount of fluid, such as fuel and more specifically natural gas, to a target delivery site along at least two pipeline segments wherein a predetermined number of flow meters corresponding to a total of the at least two pipeline segments are provided to meter flow to the site, the predetermined number of flow meters being disposed in parallel for flowing a respective portion of the total flow to the site.

In one embodiment the flow from the at least two pipeline segments is combined upstream of the at least two flow meters and the combined flow is then split into a number of pathways corresponding to the number of flow meters and flowed through the respective flow meters for determining the capacity flow.

In another embodiment, each flow meter is associated with a respective pipeline segment. The outflows from each of the flow meters are then combined for delivery to the site.

As noted above, in the presently preferred embodiment, the fluid flowing through the respective pipeline segments is a fuel and more particularly natural gas. Thus, the fluid flowing through each of the pipeline segments is the same.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
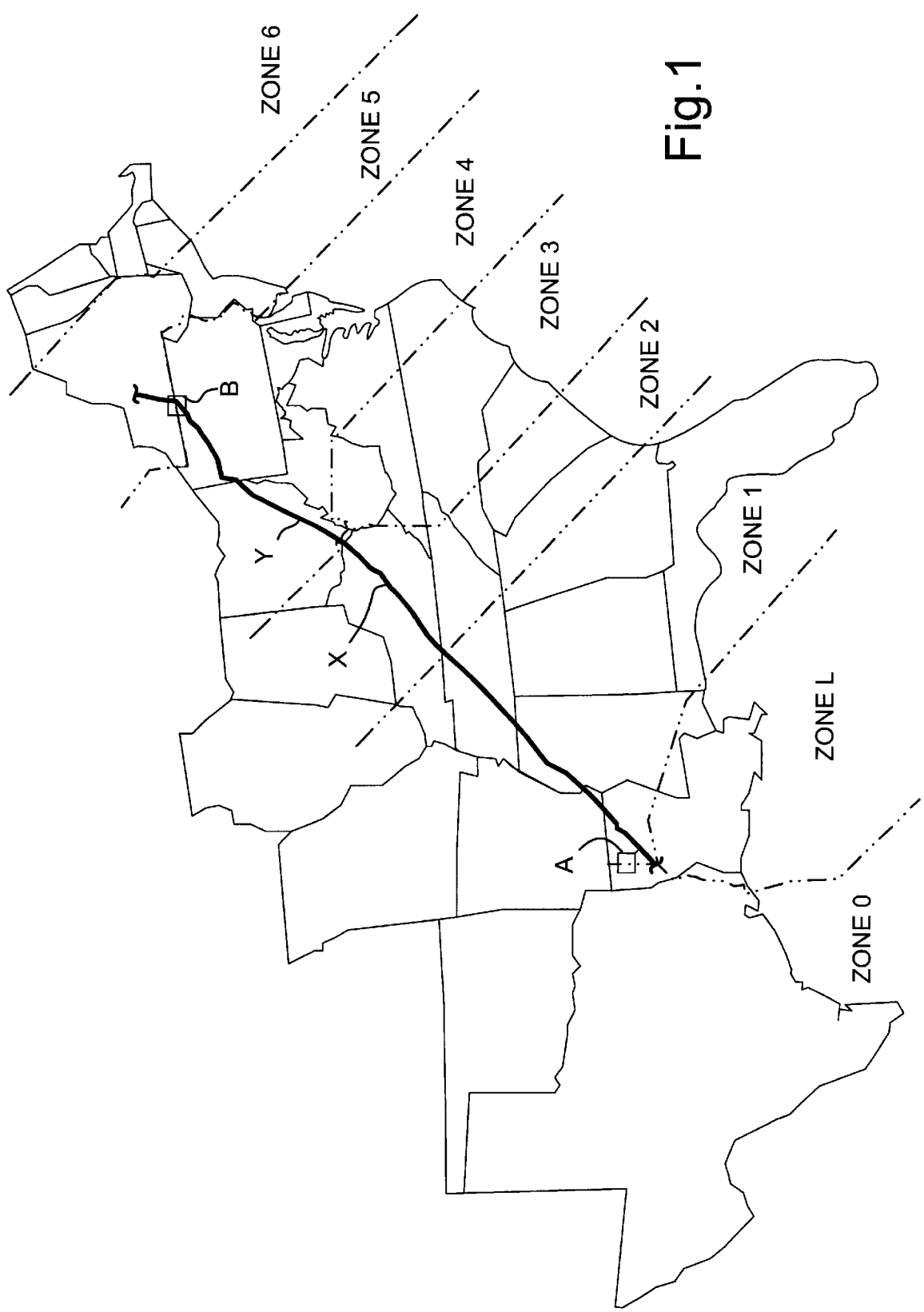
FIG. 1 is a schematic illustration of pipeline transmission system.

As segmentation practices have evolved over the last few years within the pipeline sector and given the mandate of the Federal Energy Regulatory Commission (FERC) for pipeline transmission companies to allow segmentation by shippers under FERC Order 637, a significant amount of value is at stake. Indeed, the development of segmentation practices that maximize the efficient use of contract capacity will be of substantial benefit to shippers and potentially end users/customers.

At present, some value can be extracted using currently known practices, such as supplying multiple end users or customers from multiple sources without mainline overlap. However, the development of new and unique segmentation systems and processes by providing new system components, devices, and assemblies not currently known or utilized in the industry will enhance a shipper's ability to extract significant value inherent within the capacity they now have under contract. The development of such new and unique segmentation processes and systems will increase efficiency, load factors and result in mitigation of demand charges.

According to the invention, a new and unique, end-user specific, segmentation system and process are provided for shippers to extract significant value inherent within the capacity they have under contract with a pipeline transmission company.

As noted above, the current standard for pipeline segmentation is generally as follows:

1) Segments cannot over-lap; total capacity on any one segment is limited to the subscribed Maximum Daily Quantity (MDQ), also referred to herein as contract capacity.

2) It is in general inconsistent with a capacity contract to double up or exceed MDQ at a delivery point (meter) or other interconnect. For example if the MDQ of the capacity is 10,000 dth/day, then that is all that is allowed to flow at a particular meter or interconnect.

In accordance with the invention, in order to fully capture the inherent value of segmenting capacity at a single end use location in accordance with the terms and conditions of the pipeline's tariff on segmentation, a new metering/flow control assembly is provided to meet the standards and pipeline rules for pipeline segmentation.

More specifically, in accordance with the invention, at the end user's interconnect, the currently utilized single meter/pressure reduction/flow control device is eliminated and replaced with a multi-meter/pressure reduction/flow control system. In the presently preferred embodiment of the invention, the multi-meter/pressure reduction/flow control system includes a meter/pressure reduction/flow control device (hereinafter referred to as a flow meter assembly) for each pipeline segment from which requirement is flowed to the end user. As discussed in greater detail below, this can be accomplished through either the installation of a manifold type configuration incorporating multiple flow meter assemblies at the end user and/or the installation of a second or plural pipeline interconnect(s), each having a respective meter/pressure reduction/flow control device, at or nearby the existing interconnect.

In a typical application, an end user or customer is located at a point along the pipeline system and thus in general segmentation is maximized in accordance with the invention by flowing contract capacity along first and second parts of the pipeline, i.e., pipeline segments from first and second remote sources to the end user or other target delivery location. Nevertheless in certain circumstances an end user or customer or other target site may be located at the intersect of a plurality of pipeline segments. In such a case a respective meter/pressure reduction/flow control device is provided in association with each of the pipeline segments terminating at the end user/customer/target delivery location.

Figure 2:
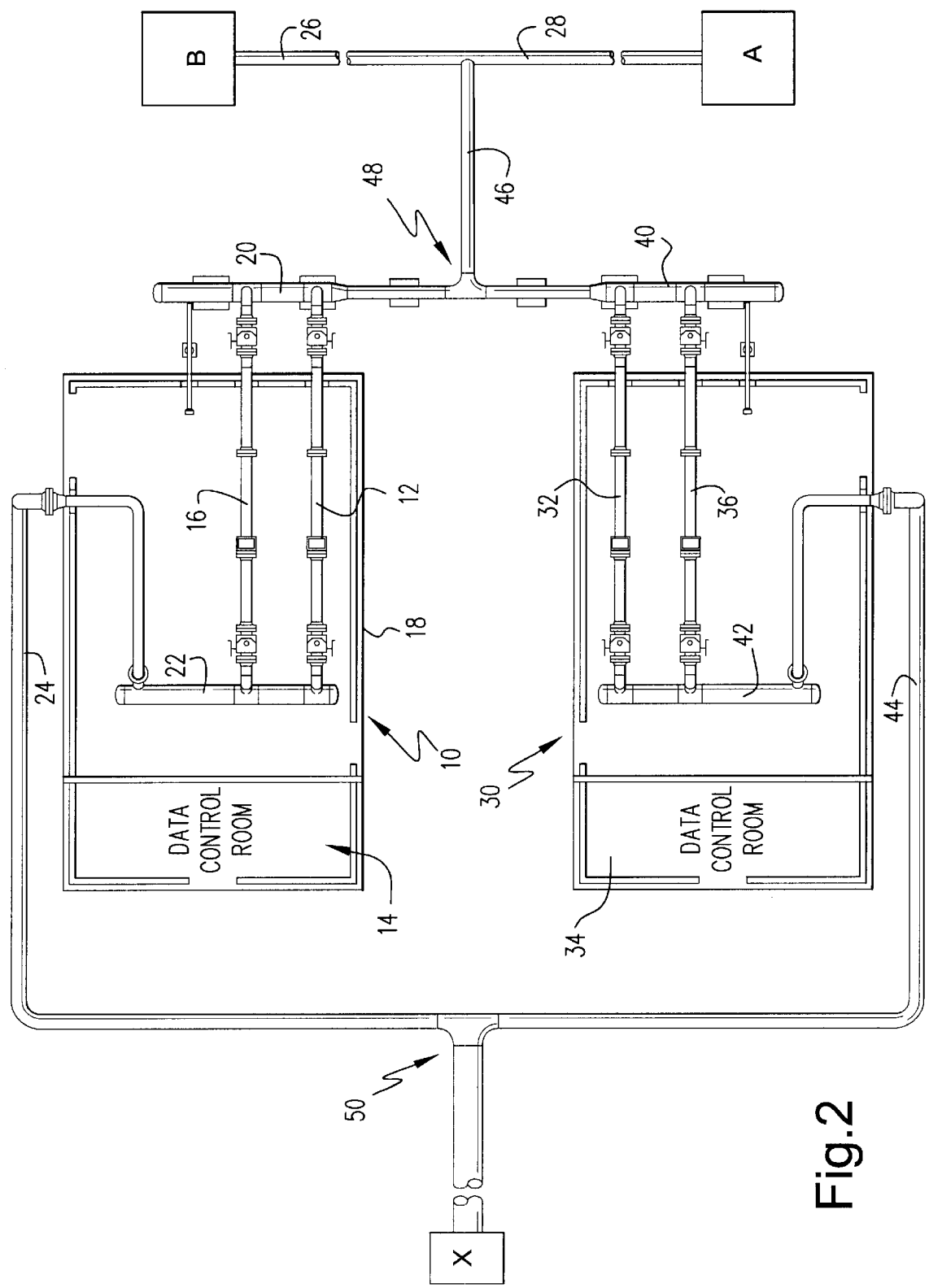
FIG. 2 is a schematic view of a requirement delivery system according to a first embodiment of the invention.

With reference to FIG. 2, a first embodiment of the invention will be described in greater detail. In general, a flow meter assembly 10 for capacity supply, also referred to as a delivery point, will include a primary flow meter 12 for metering flow that is monitored, e.g., electronically with an electronic system housed within a data control room 14 (known electronic links between meter and data control omitted for clarity). Typically, in addition to the primary flow meter 12, a secondary flow meter 16 is provided in parallel flow relation to the primary flow meter within the meter room 18. The secondary flow meter 16 is deactuated during operation of the primary flow meter and thus is provided solely for use in the event the primary flow meter becomes clogged or otherwise fails. Thus, as used herein a meter assembly refers to a generally conventional meter arrangement composed of a primary flow meter and a secondary, back-up flow meter. In the event no secondary, back up flow meter is provided, however, a meter assembly may have only a single flow meter incorporated therein. Accordingly, a meter assembly is an assembly of one or more meters wherein only one said meter is operable at any point in time.

Because in the illustrated embodiment meter assembly 10 includes a primary and secondary flow meters 12, 16 an in-flow manifold 20 is provided at the respective inlet ends of the primary and secondary flow meters and an outflow manifold 22 is provided at the outflow end of the primary and secondary flow meters. In this way, irrespective of whether the primary or secondary flow meter is operational, no further valve actuation or flow control is required. It is to be understood, however, that such valving and flow control can be incorporated in the assembly without departure from the invention. At the outlet end of the meter assembly is a pipeline 24 for delivering the flow as input to the end user or target delivery site.

The embodiment illustrated in FIG. 2, so that capacity can be flowed from a first source B along pipeline segment 26 and also from a second source A along pipeline segment 28 to provide a flow to the end user that is e.g., twice the contract capacity, a multi-meter system or manifold including at least two meter assemblies is provided in accordance with the invention to receive flows from both pipeline segments 26 and 28. Thus, in addition to the first meter assembly 10 described above, a second flow meter assembly 30 is provided in parallel thereto. Otherwise, the second flow meter assembly 30 substantially identically corresponds to the first flow meter assembly 10. Thus, in the illustrated embodiment the second flow meter assembly includes primary and secondary flow meters 32, 36 and an associated data control room 34. Furthermore, an in-flow manifold 40 and out-flow manifold 42 are defined at respective ends of the flow meters 32, 36 and a flow line 44 conducts the flow to the end user or target site X. Because the inflow through pipe 46 from the pipeline segments 26, 28 is bifurcated as at 48, generally one half the fluid, such as natural gas, inflow will be directed to each of the two meter assemblies 10, 30, so each meter assembly is effectively associated with a respective pipeline segment 26, 28. As noted above, each meter assembly 10, 30 is associated with a data control room 14, 34 for monitoring flow through the operating meter. Thus, each meter will effectively register the associated flow through the respective pipeline segment whereby contract capacity has not been exceeded in spite of the delivery to a single customer. The outflows of each of the meter assemblies is illustrated as recombined at 50 for flow to the end user X. However, depending upon the requirements of the end user the flow to that single end user, may be maintained as bifurcated output flow 24, 44, e.g., to respective storage facilities or other parts of the end user/target facility.

Figure 3:
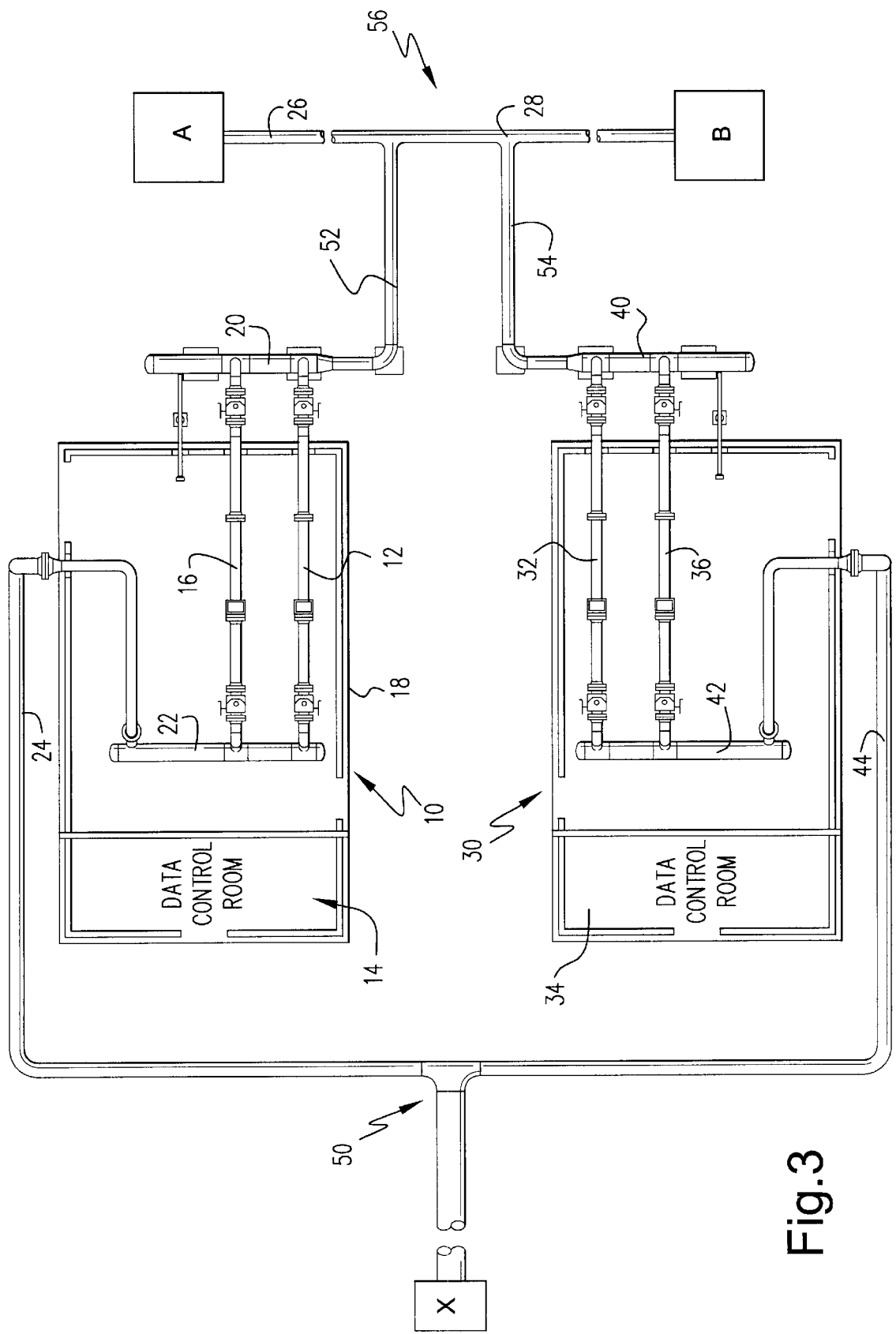
FIG. 3 is a schematic view of a requirement delivery system according to a second embodiment of the invention.

FIG. 3 illustrates an alternative and presently preferred embodiment of the invention wherein each meter assembly 10, 30 is more clearly associated with a respective pipeline segment 26, 28. In this embodiment, the meter assemblies generally correspond to the assemblies illustrated and described with reference to FIG. 2. Accordingly, the component numbering therefor is repeated in FIG. 3 as appropriate. In this embodiment, however, inflow to each respective meter is provided through respective inflow pipes 52, 54 provided at spaced apart locations along the primary or main pipeline 56. Each of the meter assemblies 10, 30 again has a generally conventional configuration but the meter assemblies are provided at a single end user or target location for supplying of a fluid such as natural gas to that single end user or target facility.

Under the current standard for pipeline segmentation, certain end users are limited in their ability to mitigate demand charges through the segmentation process. For example, the certain power plant required 100,000 dth/day of delivery, it would traditionally secure 100,000 dth/day of capacity to the plant. By installing a manifold type configuration of multiple meters at the interconnect of the plant, as shown in FIG. 2, or by installing a second pipeline interconnect at or nearby the existing interconnect, as shown in FIG. 3, the supply to the plant can be in effect doubled up without doubling up at any meter. With a plural meter assembly configuration as described herein, the same power plant can secure (contract for) 50,000 dth/day of capacity knowing that it could create an in the path backhaul segment to bring another 50,000 dth/day to the plant. The backhaul segment would only be charged variable costs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for supplying a predetermined amount of fluid to a target end user delivery site from a plurality of fluid sources along a pipeline system, the pipeline system extending at least between the plurality of fluid sources, the target delivery site being disposed along the pipeline system, spaced from the fluid sources so that a plurality of pipeline segments are defined, each extending at least from a respective fluid source to said target site for delivering a respective portion of said predetermined amount of fluid to said target site; the system including a plurality of flow meter assemblies disposed in parallel flow relation at said target end user delivery site, a said meter assembly being provided to correspond to each pipeline segment whereby the number of flow meter assemblies corresponds to the number of pipeline segments for delivering said predetermined amount of fluid, each said flow meter assembly comprising at least one flow meter, and wherein outputs from said flow meter assemblies terminate at said target end user delivery site.

2. A system as in claim 1, wherein outputs from said flow meter assemblies are combined downstream of said flow meter assemblies.

3. A system as in claim 1, wherein there are two pipeline segments each extending from a respective fluid source and wherein there are two flow meter assemblies, each corresponding to a respective pipeline segment.

4. A system as in claim 1, wherein at least one of said plurality of flow meter assemblies comprises a primary flow meter and a secondary, backup flow meter.

5. A system as in claim 1, further comprising a common conduit upstream of said plurality of flow meter assemblies operatively coupled at an upstream end thereof to each of said plurality of pipeline segments for receiving fluid therefrom, said common conduit being operatively coupled at a downstream end thereof to said plurality of flow meter assemblies for flowing fluid thereinto.

6. A system as in claim 1, wherein each said flow meter assembly is operatively coupled to said respective pipeline segment so as to receive flow from said respective pipeline segment.

7. A system as in claim 1, wherein said pipeline system is a part of an interstate fuel pipeline system.

8. A system as in claim 1, wherein each said flow meter assembly is a natural gas flow meter.

9. A method for supplying a predetermined amount of fluid to a target delivery site, comprising:

providing a pipeline system extending at least between a plurality of fluid sources, the target delivery site being disposed along the pipeline system, spaced from the fluid sources so that a plurality of pipeline segments are defined, each extending at least from a respective fluid source to said target site for delivering a respective portion of said predetermined amount of fluid to said target site;

providing a plurality of flow meter assemblies disposed in parallel flow relation at said target delivery site, a said meter assembly being provided to correspond to each pipeline segment whereby the number of flow meter assemblies corresponds to the number of pipeline segments for delivering said predetermined amount of fluid, each said flow meter assembly comprising at least one flow meter;

flowing a first portion of said predetermined amount of fluid from a first source along a first pipeline segment to a vicinity of said target delivery site;

concurrently to said step of flowing a first portion, flowing a second portion of said predetermined amount of fluid from a second source along a second pipeline segment to a vicinity of said target delivery site; and flowing said first and second portions from the first and second pipeline segments through first and second parallel flow meter assemblies.

10. A method as in claim 9, further comprising combining outflows from said flow meter assemblies downstream thereof.

11. A method as in claim 9, further comprising combining said first and second portions upstream of said flow meter assemblies and then bifurcating the flow to the respective flow meter assemblies.

12. A method as in claim 11, further comprising combining outflows from said flow meter assemblies downstream thereof.

13. A method as in claim 9, where said step of flowing said first and second portions from the first and second pipeline segments comprises flowing said portions in parallel, each to a respective flow meter assembly.

14. A method as in claim 9, wherein said step of flowing the fluid comprises flowing a fuel.

15. A method as in claim 14, wherein said fuel is natural gas.

16. A method as in claim 9, wherein said fluid flowing from first source is the same fluid as said fluid flowing from second source.

17. A method as in claim 9, wherein flow output from said first and second parallel flow meter assemblies terminates at said target delivery site.

18. A method for supplying a predetermined amount of fluid to a target delivery site, comprising:

providing a pipeline system extending at least between a plurality of fluid sources, the target delivery site being disposed along the pipeline system, spaced from the fluid sources so that a plurality of pipeline segments are defined, each extending at least from a respective fluid source to said target site for delivering a respective portion of said predetermined amount of fluid to said target site;

providing a plurality of flow meter assemblies disposed in parallel flow relation at said target delivery site, a said meter assembly being provided to correspond to each pipeline segment whereby the number of flow meter assemblies corresponds to the number of pipeline segments for delivering said predetermined amount of fluid, each said flow meter assembly comprising at least one flow meter;

flowing a first portion of said predetermined amount of fluid from a first source along a first pipeline segment to a first flow meter assembly of said plurality of flow meter assemblies;

concurrently to said step of flowing a first portion, flowing a second portion of said predetermined amount of fluid from a second source along a second pipeline segment to a second flow meter assembly of said plurality of flow meter assemblies; and flowing the metered fluid to said target delivery site.

19. A method as in claim 18, further comprising combining outflows from said first and second flow meter assemblies downstream thereof.

20. A method as in claim 18, wherein the fluid comprising said first portion of said predetermined amount of fluid from first source is the same fluid as the fluid comprising said second portion of said predetermined amount of fluid from second source.

21. A method as in claim 20, wherein said fluid flowing from said first and second sources is natural gas.

22. A method as in claim 17, wherein flow output from said first and second parallel flow meter assemblies terminates at said target delivery site.

* * * * *